May 6, 1969   H. WILSON   3,442,773
ELECTROCHEMICAL GAS MEASURING SYSTEMS
Filed June 8, 1966
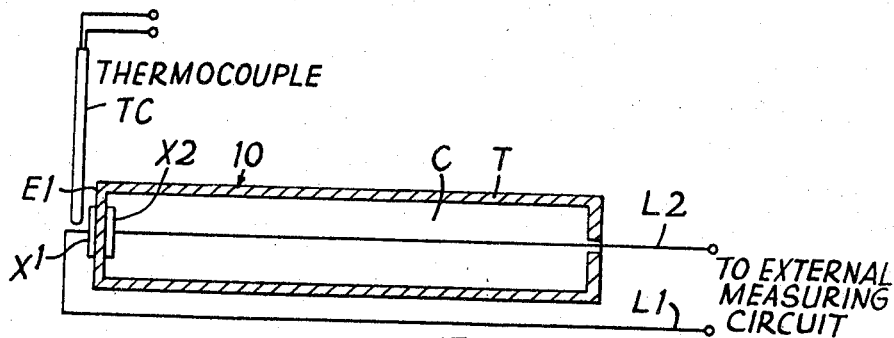
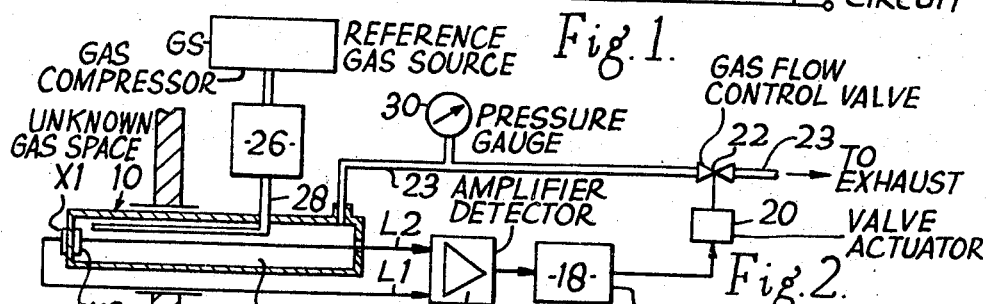
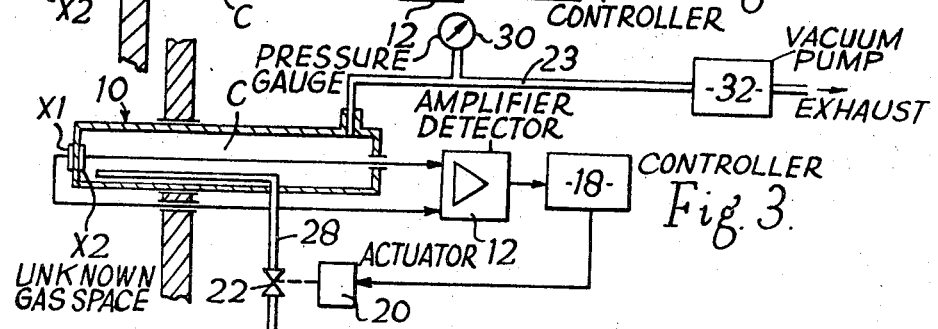
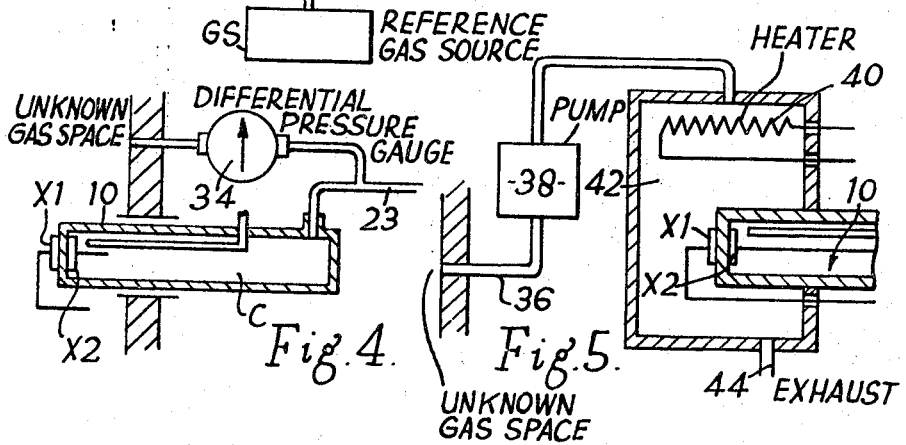
INVENTOR
HAYDN WILSON
By Young & Thompson
ATTYS 3,442,773
ELECTROCHEMICAL GAS MEASURING SYSTEMS
Haydn Wilson, Luton, England, assignor to George Kent Limited, Luton, England, a British company
Filed June 8, 1966, Ser. No. 556,031
Claims priority, application Great Britain, June 10, 1965, 24,584/65
Int. Cl. B01k 1/00
U.S. Cl. 204—1          16 Claims This invention relates to a method for measuring the percentage content or partial pressure of a constituent in a mixture of gases and to apparatus for effecting such measurement.

The measurement of, for example, the oxygen content or the oxygen partial pressure of gases is important both as an indication of the efficiency of an industrial process, such as in the combustion of fuel in a furnace, and as a guide to the suitability of a particular gas for use in a reducing atmosphere in an annealing plant.

The various methods that are available for the measurement of oxygen content in furnace gases require a sample of the gas to be obtained from the furnace. Sampling systems provided for this purpose generally include means for filtering the sample and reducing its temperature before the final analysis is made by measuring a physical property of the gas sample or by an electrochemical method. Many different types of sampling systems have been devised in an attempt to provide a system which will deliver a truly representative sample of the gas to an analyser with a minimum delivery time delay and which will operate continuously without the need for excessive maintenance.

Problems associated with the design of these sampling systems have resulted in attention being directed in recent years to the possibility of providing a system incorporating an oxygen meter and which dispenses with a requirement for obtaining a sample of the gas. Such a system has been produced utilising an electrochemical oxygen meter which possesses the advantage over previous methods of its suitability for operation at high temperature. This feature permits the sensing or detecting element of the oxygen meter to be placed in direct contact with the high temperature gases which are to be analysed so that there is no longer need for a sampling system.

Development of the electrochemical meter has centered on the use of a particular type of electrochemical detector known as an oxygen concentration cell which consists of a solid electrolyte and two chemically inert electronically conducting electrodes spaced from each other but each in physical contact with the solid electrolyte, the solid electrolyte being an oxide with certain well defined properties.

The very wide range of the oxygen concentration cell enables measurement of the oxygen content of gases to be made in a range which extends from proportions of 100% oxygen right down to oxygen partial pressures in the region of $10^{-20}$ atmosphere. Partial pressures in this last mentioned region are frequently found in the reducing atmospheres of bright annealing furnaces or in the top-gases of blast furnaces and in order to assess the reducing power of the gas it has been the practice to determine the $CO/CO_2$ or $H_2/H_2O$ ratio of the atmosphere. Measurement of the oxygen concentration provides a much more direct measure of the reducing properties of a gas and may simply be related to the $CO/CO_2$ or $H_2/H_2O$ ratio provided that the operating temperature of the cell and the temperature of the gas and the gas components are in chemical equilibrium. It has not previously been practical to obtain a direct measurement of the oxygen concentration because of the very low values usually encountered.

The principle of the oxygen concentration cell has become well established, although it is only in recent years that investigations have been made into the use, as the electrolyte in such cells, of commercially obtainable materials as opposed to the high purity laboratory-manufactured refractories used in earlier work, and also into the suitability of these devices for use as probes inserted directly into the furnace atmosphere.

The output EMF developed by an oxygen concentration cell is expressed by the equation:

$$E = \frac{2.303\ RT}{4F} \log \frac{(P1)}{(P2)}$$

where

E is the output EMF in volts
R is the gas constant
T is the temperature ° K.
F is the Faraday constant and
$P_1$ and $P_2$ are the partial pressures of the oxygen at the two electrodes of the cell.

It can be seen from the equation that the output E bears a simple relationship to the oxygen partial pressures at the two electrodes and is directly dependent on the logarithm of the ratio of the oxygen partial pressures. When used as a measuring device, the temperature of the cell must be maintained at above about 750° K. for measurement of the output to be achieved by practical methods due to the high resistance of the electrolyte. At lower temperatures the internal resistance of the cell is so high as to render measurement of the cell output by industrial apparatus extremely difficult.

In effecting measurement of oxygen concentration it has been customary to apply oxygen at a known pressure to one electrode and to maintain the cell temperature at a constant value or alternatively to measure the temperature at the instant of measurement and to apply an appropriate correction factor to the output. The output measurement thus made then varies as the logarithm of the unknown oxygen partial pressure. Such a measurement, however, necessitates the use of a high impedance voltage measuring circuit with the added complication of the provision either of temperature stabilization of the cell or of temperature compensation in the measuring circuit.

It is an object of the present invention to provide a method of and apparatus for effecting automatically and continuously measurement of the concentration of a constituent of an unknown gas.

According to the invention a method of providing a continuous measurement of the concentration of a constituent of an unknown gas comprises the steps of applying a reference gas to one electrode of an electrochemical detector, exposing the other electrode of such detector to the unknown gas, using the output of said detector continuously to control the pressure of the reference gas or the partial pressure of a constituent of the reference gas at said one electrode of said detector so as to maintain said pressure or said partial pressure at a value substantially equal to the partial pressure of said constituent of the unknown gas and measuring said reference gas pressure as a measure of the unknown gas concentration.

Also in accordance with the present invention, apparatus for providing a continuous measurement of the concentration of a constituent of an unknown gas comprises an electrochemical detector, means for applying a reference gas to one electrode of said electrochemical detector, the other electrode of which detector, when in use, is exposed to the atmosphere containing the unknown gas, means operative in response to the output of the detector for continuously maintaining the pressure of the reference gas or the partial pressure of one of the constituents of the reference gas at said first mentioned electrode at a value substantially equal to the partial pressure of said constituent of the unknown gas and means for continuously measuring the pressure of said reference gas as a measure of the unknown gas concentration.

Preferably said detector is an electrochemical cell, such as an oxygen concentration cell, the output EMF of which is a function of the pressures at the respective electrodes of a constituent of the unknown gas and of a similar constituent of the reference gas.

In order that the nature of this invention may be more readily understood it will now be described by way of illustrative example with reference to the accompanying drawings in which:

FIGURE 1 diagrammatically illustrates one known form of oxygen concentration cell usable as an electrochemical detector in systems for measuring the oxygen content or oxygen partial pressure of gases.

FIGURES 2 and 3 illustrate respectively two embodiments of measuring systems associated with oxygen concentration cells.

FIGURE 4 illustrates a modification applicable to either of the embodiments shown in FIGURES 2 and 3, while FIGURE 5 illustrates a further modified system in accordance with the invention.

Referring first to FIGURE 1, the form of oxygen concentration cell shown generally at 10 consists of a sealed impervious chamber C constituted by a closed-end tube T made wholly or in part of solid meramic electrolyte, with a measuring electrode X1 in contact with the electrolyte on the external face of one tube end E1 and a reference electrode X2 in contact with the electrolyte on the internal face of the same tube end E1. The external surface of the end of the tube to which the electrodes are attached is arranged to be totally surrounded by the atmosphere which is to be analysed, whilst the internal chamber C of the tube is filled with a reference gas.

The solid ceramic electrolyte used for forming at least that end of the tube carrying the electrodes X1, X2 must have the required electrochemical properties, that is to say, conduction wholly due to ion migration, and only certain oxides or oxide mixtures are suitable; lime or magnesia stabilised zirconia have heretofore been used for the electrolyte. A detecting element constituted by a cell of this type has been found to function satisfactorily at temperatures up to at least 1200° C. and can therefore be inserted directly into a furnace atmosphere. The electrodes X1, X2 are usually provided on either side of the electrolyte by coating both sides thereof with a porous platinum film and using platinum leads L1, L2 to connect these electrodes to an external measuring circuit.

In order that the cell output may be measured at a predetermined temperature or compensated for temperature variations, a thermocouple TC, conveniently of the platinum-rhodium type, is disposed in the immediate vicinity of the platinum electrodes.

FIGURES 2 and 3 illustrate two embodiments of a measuring system employing a detecting element similar to that described with reference to FIGURE 1, but because the system to be described hereinafter operates on the null-pressure principle, in which temperature variations have no effect, the thermocouple TC of FIGURE 1 is not required and is omitted.

FIGURE 2 illustrates diagrammatically one embodiment of the measuring system of the present invention in which the partial pressure of the reference gas has to be increased in order to provide the necessary null-balance condition. In this embodiment the output leads L1, L2 from the oxygen concentration cell 10 are connected to a balance amplifier-detector 12 so that any output from the measuring electrode X1 and the reference electrode X2 (which output will have an amplitude dependent upon the difference of the oxygen pressures on the respective electrodes and will have a polarity dependent upon which of the oxygen pressures is the greater) is amplified and fed as an error signal to a controller 18. The controller 18 may be any suitable known form of control device providing either an analogue or a raise/lower pulse output. The output from the controller 18 is used to drive an actuator 20, e.g. a reversible motor, which controls the position of a control valve 22 located in an exhaust conduit 23.

The reference gas is delivered from a source GS to a compressor 26 and is supplied therefrom at a positive pressure into the reference chamber C of the cell 10 by way of conduit 28. The outlet from the conduit 28 is so located within the chamber that the reference gas is admitted adjacent the reference electrode X2. This arrangement ensures that there is no stagnation of reference gas adjacent the electrode X2.

Since the valve 22 controls the outlet of reference gas from the chamber C of the cell 10, it thus indirectly controls the pressure of the reference gas within the system.

The total pressure of the reference gas present in the chamber C and conduit 23 is measured by means of a conventional pressure measuring device indicated at 30, for example a Bourdon tube instrument or manometer connected to the conduit 23.

Any difference in the partial pressures across the oxygen concentration cell 10 causes a potential difference to occur between the electrodes X1 and X2. This potential is amplified and its polarity sense detected by means of the balance amplifier 12 which feeds an appropriate error signal to the controller 18; the controller output then changes so as to re-position the control valve 22 so that the total pressure of the reference gas in the chamber C is adjusted until the partial pressures are again equal and there is no potential difference across the electrodes X1 and X2.

The oxygen partial pressure of the reference gas is related directly to the total pressure in the system, thus if the total pressure is doubled then the oxygen partial pressure will be doubled or if the total pressure is halved then the oxygen partial pressure will be halved. Since the composition of the reference gas is known, the oxygen partial pressure of the unknown gas can therefore be interpreted from the total pressure of the reference gas required to achieve balance, as shown in the following Example I wherein the reference gas was 1% $O_2$ by volume in $N_2$.

Example I

| External gas (14.7 lb./in.² abs) | | Reference gas | |
|---|---|---|---|
| $O_2$% vol. | $pO_2$ lb./in.² abs. | $pO_2$ lb./in.² abs. | Total pressure, lb./in.² abs. |
| 1.0 | .147 | .147 | 14.7 |
| 1.5 | .220 | .220 | 22.0 |
| 2.0 | .294 | .294 | 29.4 |

The total pressure of the reference gas thus varies linearly with the external gas oxygen partial pressure and can therefore be used to indicaate the percentage volume of oxygen of the external gas directly. The relationship between oxygen concentration and the total pressure is linear which is a considerable advantage over the logarithmic law of $pO_2$ to E. The pressure measuring device 30 can therefore be scaled directly in percentage oxygen concentration or oxygen partial pressure.

FIGURE 3 shows an arrangement of the measuring system in which the partial pressure of the reference gas has to be decreased to provide the necessary null-balance condition. The control valve 22 which is governed through the actuator 20 by the controller 18 is now arranged to regulate the flow of reference gas into the reference chamber C which is being continuously evacuated by a vacuum pump 32. The control valve 22 will thus so regulate the in-flow of reference gas that the partial vacuum within the chamber C is at a value at which the two partial pressures $P_1$ and $P_2$ are equal. The pressure gauge 30 again indicates the total pressure in the reference chamber C and may again be scaled directly in terms of percentage oxygen concentration or oxygen partial pressure. In Example II which follows the Reference Gas was air (21% $O_2$ by volume).

Example II

| External gas (14.7 lb./in.² abs) | | Reference gas | |
|---|---|---|---|
| $O_2$% vol. | $pO_2$ lb./in.² abs. | $pO_2$ lb./in.² abs. | Total pressure, lb./in.² abs. |
| 21.0 | 3.08 | 3.08 | 14.7 |
| 10.5 | 1.54 | 1.54 | 7.35 |
| 2.1 | .308 | .308 | 1.47 |

This vacuum arrangement is of particular advantage since it uses air as the reference gas and there is therefore no need to make provision for supplying a special reference gas.

Any variation in the pressure of the unknown gas will result in variation in the partial pressure and consequently in the total pressure of the reference gas for the same oxygen content. If the meter or gauge 30 is to be scaled directly in terms of $O_2$ content then the effects of variations in the pressure of the unknown gas can be minimised by measuring the differential pressure between the reference gas and the unknown gas atmosphere instead of just the pressure of the reference gas. FIGURE 4 illustrates such a modification of either of the arrangements shown in FIGS. 2 or 3 and in which a differential pressure measuring device 34 such as a conventional mercury U-tube or a diaphragm type differential pressure measuring instrument is connected on one side to the conduit 23 and on the other side to the gas space which is in contact with the electrode X1 of the cell 10.

The measuring system thus provides an arrangement with high sensitivity, e.g. as demonstrated by Example II above, a 10 to 1 variation in oxygen concentration using air as a reference gas provides an oxygen concentration measurement range of 2.1% to 21% $O_2$ by volume with a pressure change of from 3 inches to 30 inches mercury. Alternatively the scale can be expanded for the same pressure change by using a low oxygen concentration reference gas and increasing the total pressure of the reference gas for balance.

While arrangements of the forms described above are suitable for use where the temperature of the unknown gas is sufficiently high, e.g. of the order of 500° or above, to provide a useful cell output when this is inserted directly into the gas chamber, the present invention is not limited to use under such conditions. In those applications where the unknown gas temperature is too low to allow satisfactory measurement with the available electrochemical detector, a continuous sample of the gas under measurement may be taken and raised in temperature to a suitable level before application to the cell.

FIGURE 5 illustrates one form of modified arrangement in which the unknown gas in space P, e.g. a pipeline is sampled continuously by extraction of a relatively small volume thereof over conduit 36 by a pump 38. The extracted gas is then passed to a chamber 42 surrounding the end of the cell 10 having the electrode X1. This chamber 42 contains a furnace or heater 40 of a type suitable for raising the gas temperature without contamination or modification of its composition, e.g. an electric furnace or heater. An exhaust port 44 from the chamber 42 allows continuous outflow of the heated unknown gas and continuous measurement. The remainder of the system may be as shown in FIGURE 2 or FIGURE 3 or FIGURE 4.

I claim:
1. A method of providing a continuous measurement of the concentratiion of a constitutent of an unknown gas which comprises the steps of applying a reference gas to one electrode of an electrochemical detector, exposing the other electrode of such detector to the unknown gas, using the output of said detector continuously to control the pressure of the reference gas or the partial pressure of a constituent of the reference gas at said one electrode of said detector so as to maintain said pressure or said partial pressure at a value substantially equal to the partial pressure of said constituent of the unknown gas and measuring said reference gas pressure as a measure of the unknown gas concentration.

2. The method according to claim 1 in which the reference gas emloyed is a mixture including a known proportion of said constituent of said unknown gas and in which the partial pressure of said constituent gas component of said reference gas is made equal to the partial pressure of said constiutent of the unknown gas by increasing the total pressure of said reference gas above the total pressure of the unknown gas.

3. The method according to claim 1 in which the reference gas employed is a mixture including a known proportion of said constituent of said unknown gas and in which the partial pressure of said constituent gas component of said reference gas is made equal to the partial pressure of said constituent of the unknown gas by decreasing the total pressure of said reference gas below the total pressure of the unknown gas.

4. The method according to claim 1 for measurement of oxygen content or oxygen partial pressures in which said reference gas is air.

5. The method according to claim 1 for measurement of oxygen content or oxygen partial pressures in which said electrochemical cell is an oxygen concentration cell.

6. The method according to claim 1 which includes the step of heating a sample of the unknown gas before exposure thereof to said electrochemical detector.

7 The method according to claim 1 in which the differential pressure between the reference gas and the unknown gas is measured to determine the unknown constituent gas concentration.

8. Apparatus for providing a continuous measurement of the concentration of a constituent of an unknown gas which comprises an electrochemical detector, means for applying a reference gas to one electrode of said electrochemical detector, the other electrode of said detector being arranged for exposure to the atmosphere containing the unknown gas, means operative in response to the output of said detector for continuously maintaining the pressure of the reference gas or the partial pressure of one of the constituents of the reference gas at said first mentioned electrode at a value substantially equal to the partial pressure of said constituent of the unknown gas, and means for continuously measuring the pressure of said reference gas as the measure of the unknown gas concentration.

9. Apparatus according to claim 8, in which said electrochemical detector is an electrochemical cell.

10. Apparatus according to claim 9 when used for measurement of oxygen content or oxygen partial pressures in which said electrochemical cell is an oxygen concentration cell.

11. Apparatus according to claim 8 which includes means for supplying said reference gas to said detector at above atmospheric pressure.

12. Apparatus according to claim 8 which includes means for supplying said reference gas to said detector at lower than atmospheric pressure.

13. Apparatus according to claim 8 which comprises amplifier/balance-detector circuit means connected to be supplied at its input with the electric signal output from said detector and a bi-directional controller for valve or like means connected to be operated by the output of said amplifier/balance-detector circuit means.

14. Apparatus according to claim 13 which includes valve means for controlling the pressure of said reference gas at said detector, said vave means being arranged for operation by said controller through an actuator.

15. Apparatus according to claim 8 which includes means for heating a sample of the unknown gas before exposure to said detector.

16. Apparatus according to claim 8 in which said pressure measuring means is a differential pressure measuring device having one input connected to the space containing said unknown gas and the other input connected to the reference gas chamber of said detector.

References Cited

UNITED STATES PATENTS

| | | | |
|---|---|---|---|
| 3,296,113 | 1/1967 | Hansen | 204—195 |
| 3,347,767 | 10/1967 | Hickam | 204—195 |

JOHN H. MACK, *Primary Examiner.*

R. L. ANDREWS, *Assistant Examiner.*

U.S. Cl. X.R.

204—195